United States Patent
Shimizu et al.

(10) Patent No.: US 8,068,273 B2
(45) Date of Patent: Nov. 29, 2011

(54) DEMODULATOR

(75) Inventors: Takashi Shimizu, Kawasaki (JP); Koji Terada, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/571,787

(22) Filed: Oct. 1, 2009

(65) Prior Publication Data

US 2010/0085630 A1 Apr. 8, 2010

(30) Foreign Application Priority Data

Oct. 3, 2008 (JP) ................................. 2008-258030

(51) Int. Cl.
*G02F 2/00* (2006.01)
*H04B 10/04* (2006.01)

(52) U.S. Cl. ........ 359/325; 398/188; 398/201; 398/202; 398/212

(58) Field of Classification Search .................. None
See application file for complete search history.

(56) References Cited

U.S. PATENT DOCUMENTS

| 7,149,029 | B1 | 12/2006 | Ionov |
| 2006/0056845 | A1 | 3/2006 | Parsons et al. |
| 2006/0193639 | A1 | 8/2006 | Liu et al. |
| 2006/0222377 | A1* | 10/2006 | Hoshida et al. ............ 398/212 |
| 2007/0264029 | A1 | 11/2007 | Suzuki et al. |

FOREIGN PATENT DOCUMENTS

| EP | 1841099 A1 | 10/2007 |
| EP | 1760913 B1 | 12/2008 |
| GB | 2438061 | 11/2007 |
| JP | 2006-246471 | 9/2006 |
| JP | 2007-306371 | 11/2007 |
| WO | 89/10534 | 11/1989 |

OTHER PUBLICATIONS

"Partial DPSK with excellent filter tolerance and OSNR sensitivity", Electronics Letters Nov. 9, 2006 vol. 42 No. 23.
UK Search Report for GB 0917155.4 issued Dec. 22, 2009.

* cited by examiner

*Primary Examiner* — Hemang Sanghavi
(74) *Attorney, Agent, or Firm* — Staas & Halsey LLP

(57) ABSTRACT

A demodulator and method are provided. The demodulator for demodulating an optical signal, includes a splitter that splits a differential phase modulation signal into a first split light component and a second split light component, couples the first split light component to a first optical path and the second split light component to a second optical path, a first medium disposed on the first optical path, a second medium disposed on the second optical path and having a refractive index different from that of the first medium, and a combiner that combines the first split light component that has passed through the first medium and the second split light component that has passed through the second medium, wherein one of the first split light component and the second split light component is delayed in relation to the other.

8 Claims, 4 Drawing Sheets

DEMODULATOR

CROSS-REFERENCE TO RELATED APPLICATION

This application is related to and claims priority to Japanese Patent Application No. 2008-258030, filed on Oct. 3, 2008, and incorporated herein by reference.

BACKGROUND

1. Field

The embodiments discussed herein are directed to a demodulator.

2. Description of the Related Art

In an optical fiber communication adopting a wavelength division multiplex (WDM) system, an optical signal modulated by a differential phase shift keying (DPSK) system or the like is demodulated by a demodulator that has a delay interferometer. For example, in a delay interferometer using the DPSK system, optical paths separated by splitting are made different in geometrical length, thereby providing a delay.

In the delay interferometer, when the ambient temperature changes, optical components, etc. expand or contract, changing the optical phase of an optical signal. Accordingly, the optical phase has to be adjusted. Conventionally, a simultaneously monitoring of the electric current in a light receiving element and feed-back-controlling a phase is disclosed. Additionally, conventionally a demodulation technology using a delay interferometer is disclosed.

SUMMARY

It is an aspect of the embodiments discussed herein to provide a demodulator for demodulating an optical signal, includes: a splitter that splits a differential phase modulation signal into a first split light component and a second split light component, couples the first split light component to a first optical path and the second split light component to a second optical path; a first medium disposed on the first optical path, a second medium disposed on the second optical path and having a refractive index different from that of the first medium, and a combiner that combines the first split light component that has passed through the first medium and the second split light component that has passed through the second medium, wherein one of the first split light component and the second split light component is delayed in relation to the other.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
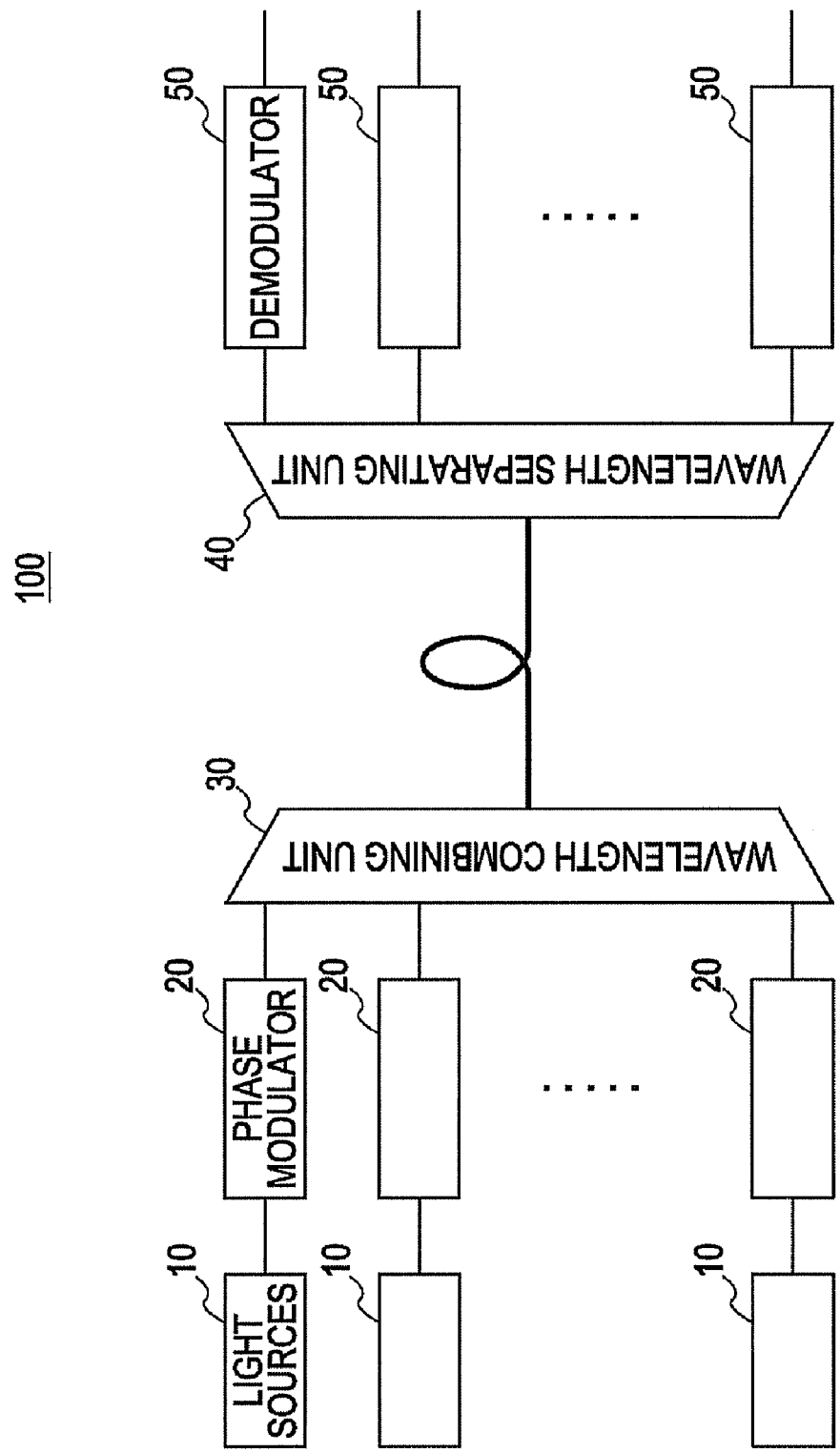
FIG. 1 illustrates a differential phase shift key optical transmission system including a demodulator according to an exemplary first embodiment.

FIG. 1 illustrates a differential phase shift keying (DPSK) optical transmission system 100 that includes demodulators 50 according to an exemplary first embodiment. As illustrated in FIG. 1, the optical transmission system 100 includes a plurality of light sources 10, a plurality of phase modulators 20, a wavelength combiner (wavelength combining unit) 30, a wavelength splitter (wavelength separating unit) 40, and a plurality of demodulators 50.

The light sources 10 emit light signals of different wavelengths. Each phase modulator 20 receives a light signal emitted from the corresponding light source 10. The phase modulators 20 produces phase modulation signals from the optical signals received from the light sources 10. Each phase modulation signal produced by the corresponding phase modulator 20 is input to the wavelength combiner 30. The wavelength combiner 30 combines a plurality of input phase modulation signals in different wavelengths. The combined phase modulation signals are input to the wavelength splitter 40 via optical transmission paths, etc.

The demodulators 50 demodulate the separated phase modulation signals. In this case, each of the demodulators 50 causes a phase modulation signal and a signal whose modulation rate has been delayed to interfere with each other, thereby demodulating the phase modulation signal. DPSK optical transmission is carried out by the foregoing process. For example, a given delay may be a one bit period (one symbol) or may be from 65% to 125% of a one bit period. Further, a DPSK precoder on the transmission side may be delayed by 2 bits or other methods.

Figure 2:
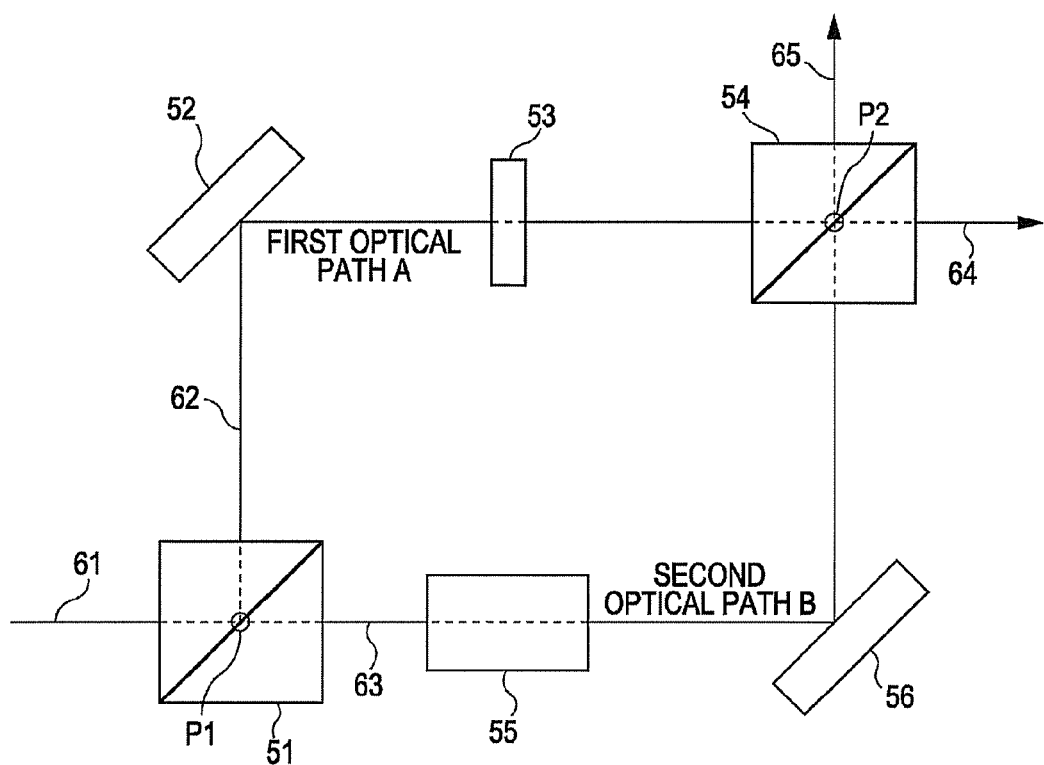
FIG. 2 illustrates a demodulator according to an exemplary embodiment.

FIG. 2 illustrates demodulator 50 in further detail. As illustrated in FIG. 2, the demodulator 50 includes a power splitter 51, a mirror 52, a first medium 53, a power splitter (combiner) 54, a second medium 55, and a mirror 56. In FIG. 2, a phase modulation signal 61 is input in the X-axis direction.

The phase modulation signal 61 input to each demodulator 50 may be further input to the power splitter 51. The power splitter 51 splits the phase modulation signal 61 into a first split light component 62 in the Y-axis direction and a second split light component 63 in the X-axis direction. The point at which the phase modulation signal 61 splits is referred to hereinafter as "point P1". The mirror 52 reflects the first split light component 62 in the X-axis direction. The first split light component 62 reflected by the mirror 52 passes through the first medium 53 and is input to the power splitter 54 in the X-axis direction.

The second split light component 63 passes through the second medium 55 and is reflected in the Y-axis direction by the mirror 56. The second split light component 63 reflected by the mirror 56 is input to the power splitter 54 in the Y-axis direction.

The power splitter 54 functions as a combiner interference section. In the power splitter 54, the first split light component 62 combines and interferes with the second split light component 63 and then exits in the X-axis direction as a demodulation signal 64. In addition, the second split light component 63 combines and interferes with the first split light component 62 and then exits in the Y-axis direction as a modulation signal 65. The point at which the first split light component 62 and second split light component 63 interfere with each other will hereinafter be referred to as "point P2".

In an exemplary embodiment, the second medium 55 has an optical length different from that of the first medium 53 so that the second split light component 63 is delayed in relation to the first split light component 62 that has passed through the first medium 53. In this case, the optical length is adjusted by the refractive index and thickness of the second medium.

In an exemplary embodiment, a first optical path A, from the point P1 to P2, along which the first split light component 62 passes may be set geometrically equal to a second optical path B, from the point P1 to P2, along which the second split light component 63 passes. The refractive index of the first medium 53 may be s represented by nA, and the refractive index of the second medium 55, by nB. Additionally, the distance for which the first split light component 62 passes through the first medium 53 is represented by LA, and the distance for which the second split light component 63 passes through the second medium 55, by LB.

If the length of delay is represented by D(sec), the following formula (1) is established in which c represents the light speed in vacuum, and $\Lambda$ represents the wavelength of an optical signal:

$$D = (LA \cdot nA - LB \cdot nB)/c\Lambda \quad (1)$$

In the exemplary embodiment, the first and second media 53 and 55 have different refractive indexes, thereby yielding a delay. This obviates the need to differentiate the first and second optical paths A and B in geometrical length so as to yield a delay. This facilitates phase control.

The equal length of the first and second optical paths A and B restrains any change in the length of delay even if each modulator 50 expands or retracts due to a change in, for example, ambient temperature. This eliminates the need for feedback control of the length of delay, hence facilitating phase adjustment. The "equal length" mentioned above refers to a case where if there is no difference between the first and second optical paths A and B in refractive index, the optical phase difference between the optical signals passing along the corresponding optical paths falls within 5°.

In addition, the second medium 55 may have a thermal expansion coefficient or a temperature change rate corresponding to the refractive index so as to ease any change in difference in optical length between the first and second optical paths A and B, which is caused by a temperature change in the demodulator 50. In this case, even if ambient temperature changes, difference in optical length between the first and second optical paths A and B can be further suppressed.

The thermal expansion coefficient of the first medium 53 is represented by KA, and the temperature change rate corresponding to the refractive index of the first medium 53 is represented by dnA/dt. The thermal expansion coefficient of the second medium 55 is represented by KB, and the temperature change rate corresponding to the refractive index of the second medium 55 is represented by dnB/dt. When the first and second split light components 62 and 63 are combined in response to a change in ambient temperature $\Delta t$ (e.g., approximately, 70° C.), the following formula (2) may be satisfied:

$$LA(1+\Delta t \cdot KA) \cdot (nA+\Delta t \cdot dnA/dt) - LA \cdot nA = LB(1+\Delta t \cdot KB) \cdot (nB+\Delta t \cdot dnB/dt) - LB \cdot nB \quad (2).$$

For example, in the demodulators 50 corresponding to Free Spectral Range (FSR) approximately 40 GHz signals, the required delay in each case is about 16.25 psec. A description is given of a case where the first and second media 53 and 55 are fused quartz and sapphire, respectively. The refractive index of the fused quartz is 1.46, its thermal expansion coefficient is 0.55×10−6, and its dn/dt is 13.7×10−6. The refractive index of the sapphire is 1.77, its thermal expansion coefficient is 5.3×10−6, and its dn/dt is 13.7×10−6. When the thicknesses of the first and second media 53 and 55 are 34 mm and 14 mm, respectively, the formula (2) described above is satisfied.

It should be noted that combinations of the first and second media 53 and 55 are not limited to that described above. Table 1 illustrates other examples of the combination of the first and second media 53 and 55 respectively that can be used for the demodulators 50 corresponding to FSR65 GHz signals.

TABLE 1

| First Medium | | Second medium | |
|---|---|---|---|
| Material | Thickness (mm) | Material | Thickness (mm) |
| Fused Quartz | 19.3 | Silicon | 1.6 |
| Fused Quartz | 22.2 | Calcium Fluoride | 13.4 |
| BK7 | 65.6 | Sapphire | 37.7 |

Figure 3:
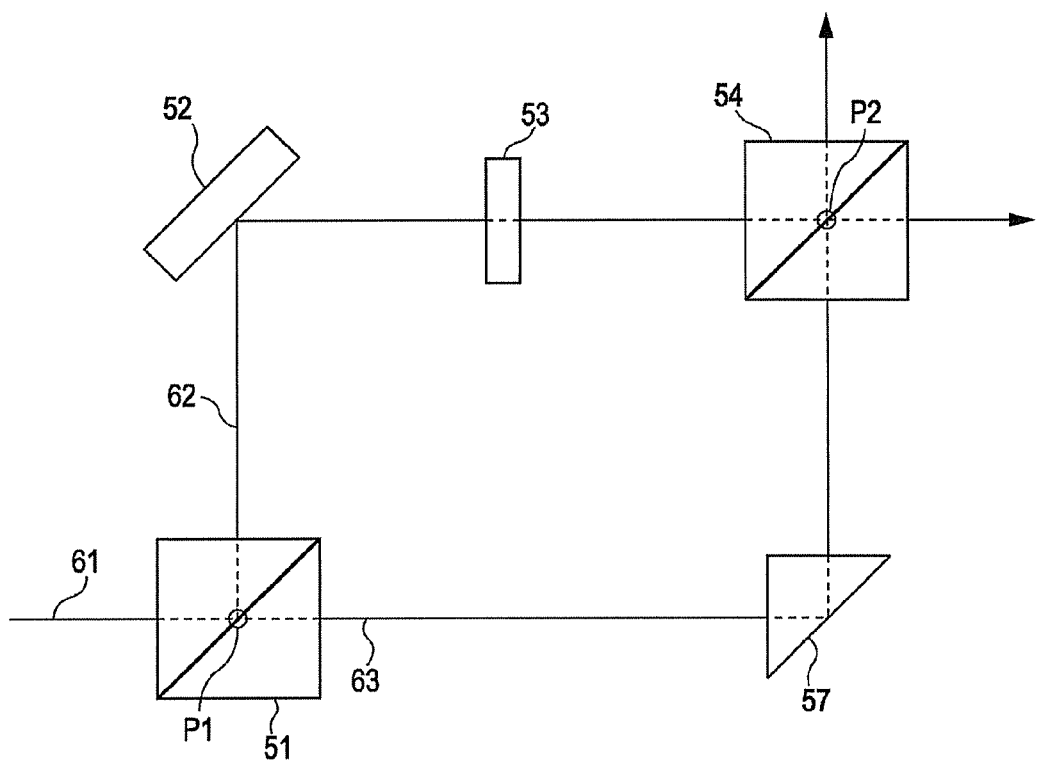
FIG. 3 illustrates a demodulator according to a second exemplary embodiment.

FIG. 3 illustrates a demodulator 500 according to a second embodiment. As illustrated in FIG. 3, the demodulator 500 has a prism mirror 57 in lieu of the second medium 55 and mirror 56. Other elements of the second embodiment are similar to that of the first embodiment.

When the second split light component 63 is reflected by the prism mirror 57, the second split light component 63 passes through the prism mirror 57. Accordingly, in the second embodiment, the prism mirror 57 functions as a second medium on the second optical path B.

In this embodiment, the prism mirror 57 has a refractive index and thickness different from those of the first medium 53 such that the second split light component 63 is delayed in relation to the first split light component 62 that has passed through the first medium 53. It is preferable that the first and second optical paths A and B be equal geometrically and that the first medium and the prism mirror 57 satisfy the formula (2).

When sapphire is used as the prism mirror 57, for example, the distance for which the second split light component 63 passes through the prism mirror 57 is 34 mm, thus satisfying the formula (2) described above.

Figure 4:
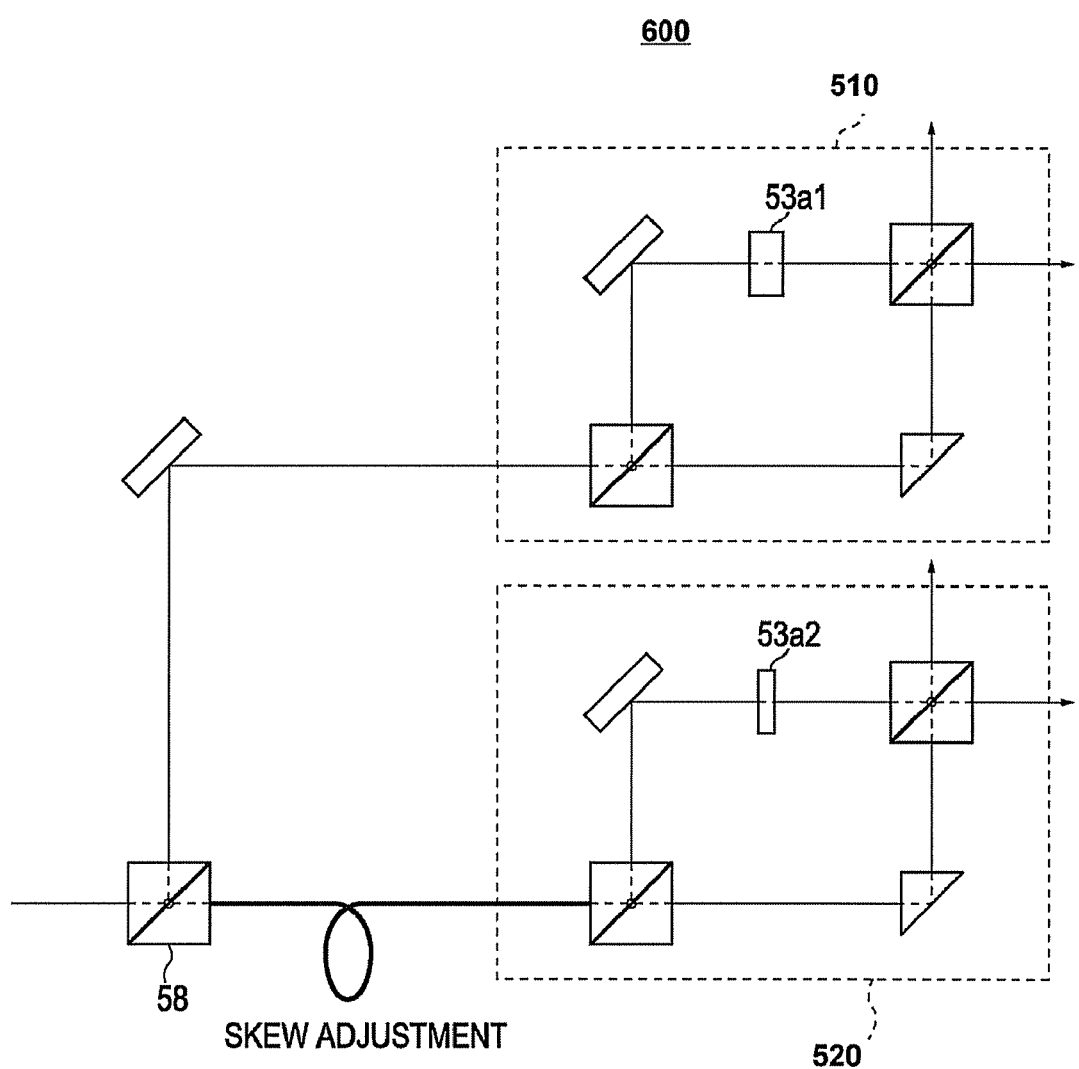
FIG. 4 illustrates a demodulator according to a third exemplary embodiment.

FIG. 4 illustrates a demodulator 600 according to an exemplary third embodiment. As illustrated in FIG. 4, the demodulator 600 includes two demodulators (e.g., a demodulator 510 and a demodulator 520) used in the first or second embodiment. For example, two separate optical signals produced as a result of splitting by a power splitter 58 are input to the corresponding demodulators.

A skew is adjusted so that the relative phase difference between the optical frequencies (e.g., about 200 THz) of optical signals input to the demodulators 510 and 520 is zero degree.

A medium 53a1 of the demodulator 510 is disposed on the first optical path created by splitting. The medium 53a1 may be set such that the difference in length between the first and second optical paths where their wavelengths are combined ensures a specific delay and such that the phase difference between the optical frequencies is −¼π.

A medium 53a2 of the demodulator 520 is disposed on the first optical path created by splitting. The medium 53a2 may be set such that the difference in length between the first and second optical paths where their wavelengths are combined ensures a specific delay and such that the phase difference between the optical frequencies is +¼π.

The demodulator 600 according to the third embodiment demodulates a differential quadrature phase shift keying (DQPSK) signal. Thus, the demodulators according to the first and second embodiments can be used as demodulators for a DQSPK signal.

According to an exemplary embodiment of the power splitter, a non-polarization beam splitter that is less dependent on polarization ensures more stable reception.

The exemplary demodulators facilitate an easy control of the phase of an optical signal in an optical transmission system that uses differential phase shift keying.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A demodulator for demodulating an optical signal, comprising:
    a splitter that splits a differential phase modulation signal into a first split light component and a second split light component, and emits the first and second split light components along first and second optical paths, respectively;
    a first medium disposed on the first optical path;
    a second medium disposed on the second optical path and having a refractive index different from that of the first medium so that the second split light component is delayed in relation to the first split light component that has passed through the first medium; and
    a combiner that combines and interferes with each other such that the first split light component that has passed through the first medium or the second split light component that has passed through the second medium is delayed in relation to the other.

2. The demodulator according to claim 1, wherein the second medium has a thermal expansion coefficient and a temperature change rate corresponding to the refractive index so as to ease any change in difference in optical length between the first and second optical paths, which results from a temperature change in the demodulator.

3. The demodulator according to claim 1, wherein the first and second optical paths are equal in geometrical length.

4. The demodulator according to claim 1, wherein if a temperature changes by a predetermined range $\Delta t$, a relation expressed by the following formula is satisfied: $LA(1+\Delta t \cdot KA) \cdot (nA+\Delta t \cdot dnA/dt) - LA \cdot nA = LB(1+\Delta t \cdot KB) \cdot (nB+\Delta t \cdot dnB/dt) - LB \cdot nB$, wherein KA and nA represent the thermal expansion coefficient and refractive index of the first medium, respectively, dnA/dt represents a temperature change rate corresponding to the refractive index of the first medium, KB and nB represent the thermal expansion coefficient and refractive index of the second medium, respectively, LA represents the distance for which the first split light component passes through the first medium, LB represents the distance for which the second split light component passes through the second medium, and dnB/dt represents a temperature change rate corresponding to the refractive index of the second medium.

5. The demodulator according to claim 1, wherein the second medium is a prism.

6. A demodulator for demodulating an optical signal, comprising:
    a splitter that splits a differential phase modulation signal into a first split light component and a second split light component, couples the first split light component to a first optical path and the second split light component to a second optical path;
    a first medium disposed on the first optical path;
    a second medium disposed on the second optical path and having a refractive index different from that of the first medium; and
    a combiner that combines the first split light component that has passed through the first medium and the second split light component that has passed through the second medium, wherein one of the first split light component and the second split light component is delayed in relation to the other.

7. A demodulator, comprising:
    a splitter that splits a differential phase modulation signal into components, and emits the components along respective paths;
    a medium disposed on one of the paths and having a refractive index so the component passing thought that medium is delayed in relation to another component passing through another medium; and
    a combiner combining received components.

8. A method of demodulating, comprising:
    splitting with a splitter a differential phase modulation signal into components;
    emitting the components along respective paths through a medium disposed on one of the paths having a refractive index so the component passing though that medium is delayed in relation to another component passing through another medium; and
    combining received components.

* * * * *

UNITED STATES PATENT AND TRADEMARK OFFICE
CERTIFICATE OF CORRECTION

PATENT NO. : 8,068,273 B2  
APPLICATION NO. : 12/571787  
DATED : November 29, 2011  
INVENTOR(S) : Takashi Shimizu Page 1 of 1

It is certified that error appears in the above-identified patent and that said Letters Patent is hereby corrected as shown below:

Column 6, Line 38, In Claim 7, delete "thought" and insert -- through --, therefor.

Signed and Sealed this
Twenty-eighth Day of February, 2012

David J. Kappos
*Director of the United States Patent and Trademark Office*